March 8, 1949.  E. R. BERGMANN  2,463,849
SHAKER CONVEYER

Filed Sept. 17, 1945  3 Sheets-Sheet 1

INVENTOR
Ernst R. Bergmann
Clarence F. Poole
ATTORNEY

March 8, 1949.　　　　E. R. BERGMANN　　　　2,463,849
SHAKER CONVEYER
Filed Sept. 17, 1945　　　　　　　　　　3 Sheets-Sheet 2
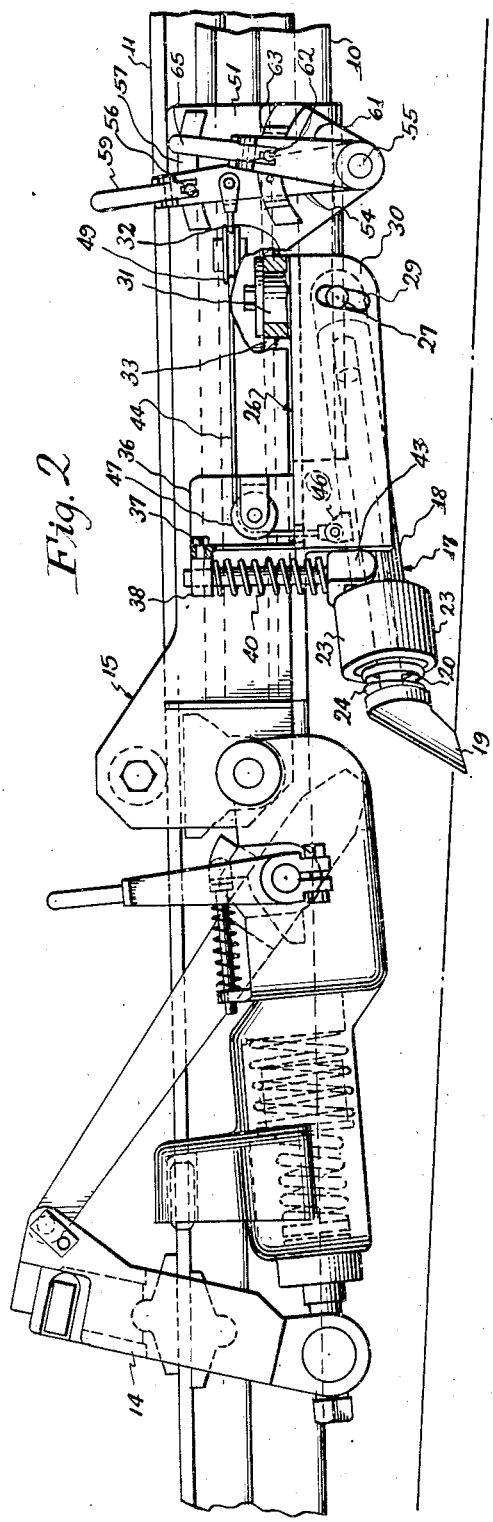
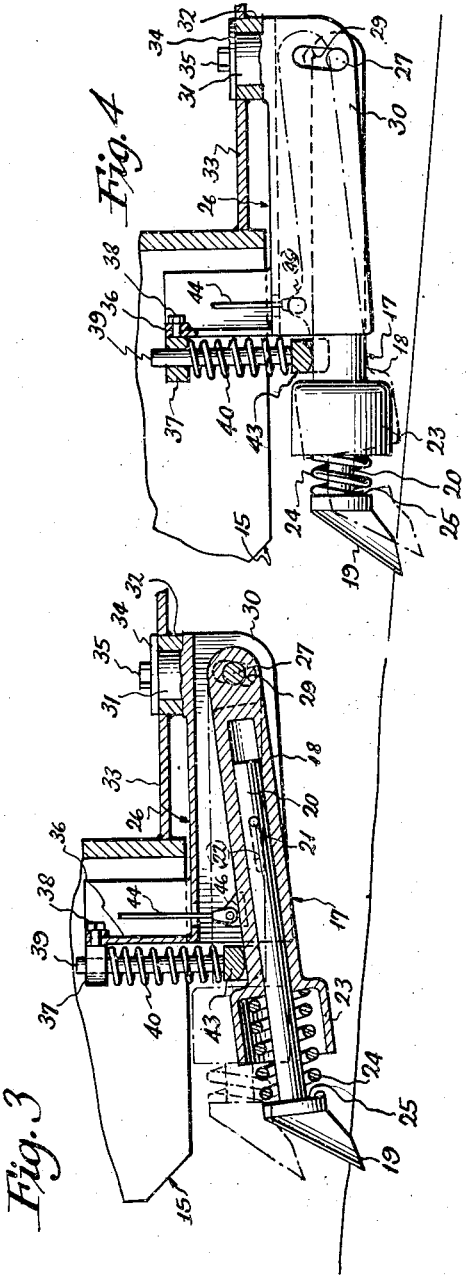
INVENTOR
Ernst R Bergmann
Clarence F. Poole
ATTORNEY March 8, 1949.  E. R. BERGMANN  2,463,849
SHAKER CONVEYER Filed Sept. 17, 1945  3 Sheets-Sheet 3

INVENTOR
Ernst R Bergmann
Clarence J. Poole
ATTORNEY

Patented Mar. 8, 1949

2,463,849

UNITED STATES PATENT OFFICE 2,463,849

SHAKER CONVEYER

Ernst R. Bergmann, Chicago, Ill., assignor to Goodman Manufacturing Company, Chicago, Ill., a corporation of Illinois Application September 17, 1945, Serial No. 616,750

9 Claims. (Cl. 198—220)

This invention relates to improvements in shaker conveyers and more particularly relates to a new and improved means for laterally moving the pick-up end of a shaker conveyer.

The principal objects of my invention are to provide a novel and simplified form of device operated by the action of the conveyer for moving the pick-up end of a shaker conveyer laterally in one direction or another about a swivel in the trough line.

These and other objects of my invention will appear from time to time as the following specification proceeds and with reference to the accompanying drawings wherein:

Figure 2 is a fragmentary view in side elevation of the device shown in Figure 1, drawn to a slightly larger scale than Figure 1;

Figure 3 is a fragmentary longitudinal sectional view taken substantially along line 3—3 of Figure 1;

Figure 4 is a fragmentary view in side elevation somewhat similar to Figure 3, but showing certain other parts in longitudinal section than are shown in Figure 3, and showing the ground engaging leg for moving the conveyer laterally in a different position of adjustment than in Figure 3;

Figure 1:
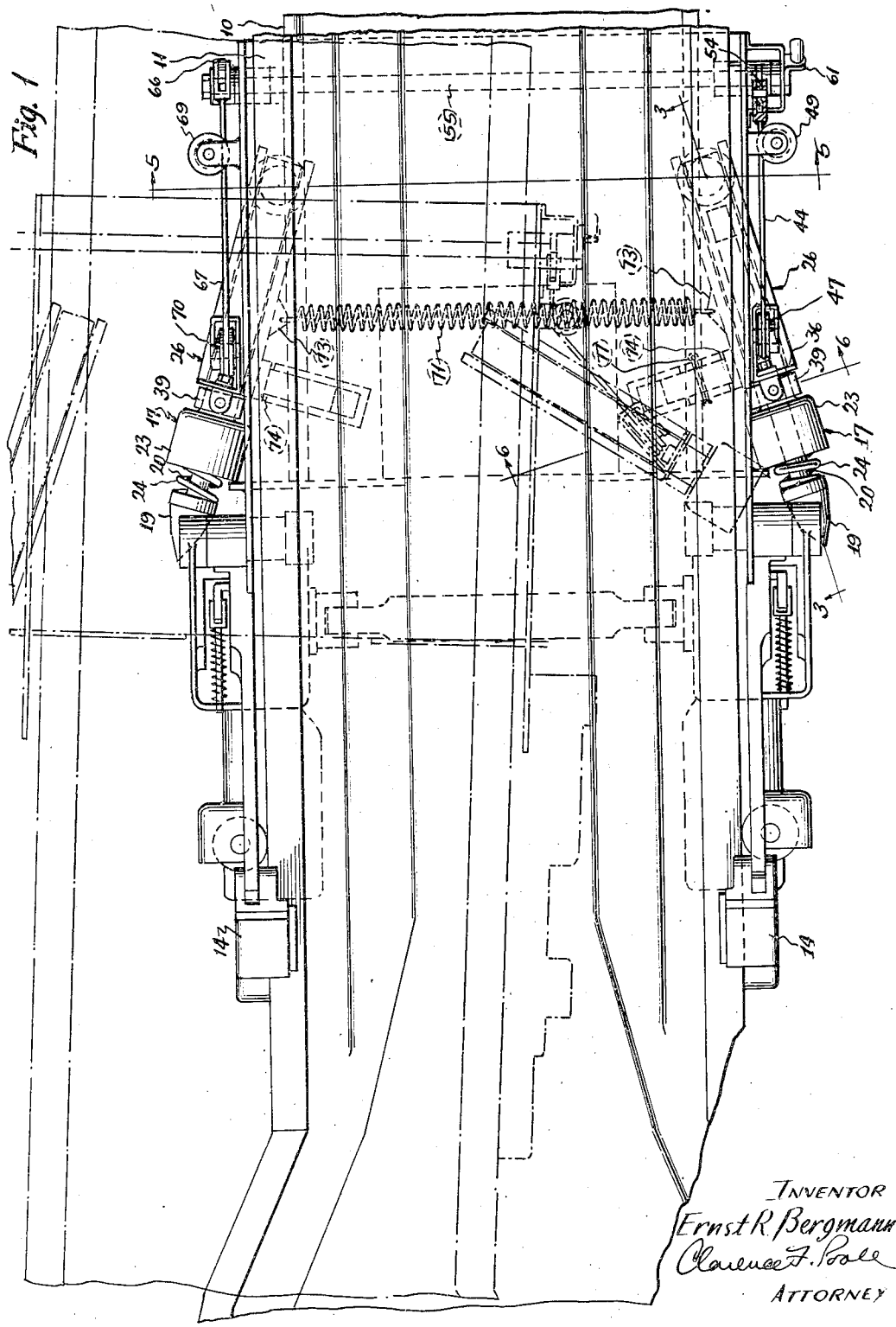
Figure 1 is a fragmentary plan view of the pick-up end of a shaker conveyer trough line having a device constructed in accordance with my invention embodied therein.

In the embodiment of my invention illustrated in the drawings a reciprocating trough 10 is shown as having an extensible trough 11 nested therein for extensible or retractible movement with respect thereto. Said reciprocating trough extends from a swivel of a shaker conveyer trough line (not shown) which permits said trough and the extensible trough to be moved laterally with respect to the trough line about said swivel, in a well known manner, so a pick-up member or shovel 12 on the inby end of said extensible trough may be moved from side to side to pick up loose material along a mine face.

A friction grip feeding mechanism 14 extending in advance of and connected with opposite sides of a frame 15 on the forward end of the reciprocating trough 10, is provided to grip opposite sides of said extensible trough during alternate strokes of the conveyer, to extensibly or retractibly move said extensible trough with respect to said reciprocating trough, in a manner well known to those skilled in the art. Said frame extends in advance of the forward end of said reciprocating trough and along opposite sides thereof, and slidably mounts the forward end of said reciprocating trough on said extensible trough. Said feeding mechanism may be of any well known form and is shown herein for illustrative purposes only, so will not herein be shown or described in detail.

Referring now to the means for moving the extensible trough 11 and the shovel 12 laterally with respect to the longitudinal center of the trough line, a ground-engaging leg 17 is mounted on each side of the reciprocating trough 10. Said legs are selectively operable to engage the ground to kick or to force the trough to move in a lateral direction by the reaction of the forward end of the desired leg against the ground during the forward strokes of the conveyer. The legs 17, 17 are each of a similar construction and are mounted on the reciprocating trough 10 in a similar manner, so only one of said legs and its mounting on said reciprocating trough need herein be described in detail.

The leg 17 includes a substantially cylindrical leg member 18 pivotally mounted on the reciprocating trough 10 for movement into and out of engagement with the ground. Said leg member has a ground-engaging claw 19 extending from the end of a rod 20, which is mounted in said leg member, for slidable movement with respect thereto. Movement of said claw and rod with respect to said leg member is limited by means of a pin 21 mounted in said rod and slidably engaging slots 22, 22 formed in opposite side walls of said leg member (see Figure 3). Said leg member has a widened substantially cut-shaped forward end 23 which forms a seat for a spring 24 encircling said rod. The end of said spring opposite from said seat abuts an inner shouldered end 25 of said claw. Said spring is relatively heavy and serves as a substantially solid member during normal lateral movement of the shovel 12, and is intended to yield to prevent breakage, when extraordinary loads are encountered.

The leg 17 is mounted on a swinging support frame 26 for vertical movement with respect thereto about its rear end. The connection between the leg member 18 and said support frame includes a pin 27 mounted in a reduced rear end portion of said leg member and extending laterally from opposite sides thereof. Said pin is mounted at its ends in elongated aligned upright slots 29, 29 formed in opposite side walls 30, 30 of said swinging support frame. Said swinging support frame is herein shown as being provided with an upwardly extending integrally formed stud 31 pivotally mounted in a boss 32 extending downwardly from a rearwardly projecting substantially horizontal plate 33 of the frame 15. A collar 34, secured to the top of said leg by a cap screw 35 and abutting the top of said boss, is provided to pivotally mount said swinging frame on said boss.

The swinging frame 26 is provided with an upright support portion 36, which extends upwardly from the upper wall thereof and has a guide member 37 mounted thereon on a cap screw 38, for pivotal movement about an axis extending longitudinally of said frame.

The guide member 37 forms a vertically slidable guide for a spring pressed plunger 39. Said plunger is encircled by a compression spring 40, which abuts the underside of the guide member 37 at its upper end, and abuts an upper shouldered portion of a bifurcated lower end 43 of said plunger at its lower end, to urge said plunger in a direction towards the ground. Said bifurcated lower end of said plunger extends along opposite sides of the cylindrical leg member 18, and engages the upper surface thereof, to urge said leg and the claw 19 into engagement with the ground.

A means is provided to positively raise the leg 17 out of engagement with the ground, which is herein shown as being a flexible cable 44 connected to the leg 17, which is the left-hand leg when looking towards the inby end of the conveyor. Said cable is pivotally connected to an ear 46 extending upwardly from the cylindrical leg member 18. From said ear said cable extends upwardly therefrom over a sheave 47, and rearwardly from said sheave to and along a horizontal guide sheave 49. From thence said cable extends rearwardly to a control lever 54, to which it is connected. Said control lever is freely mounted on a transverse shaft 55 extending beneath and journaled in the frame 15.

Figure 5:
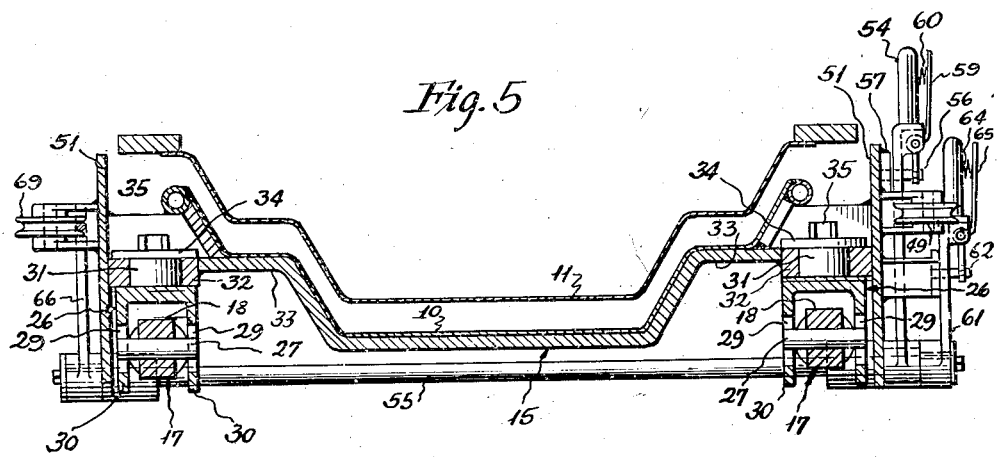
Figure 5 is a transverse sectional view taken substantially along line 5—5 of Figure 1.

The control lever 54 is locked in position by means of a pin 56, slidably mounted therein for engagement with any one of a plurality of apertures (not shown) formed in a sector 57, secured to the outer side of a side wall 51 of the frame 15. A hand grip 59 pivotally mounted intermediate its ends on said control lever, engages said pin at one of its ends and is engaged by a spring 60 adjacent its opposite end, which urges said pin into engagement with any one of the desired apertures formed in the sector 57 (see Figure 5). Said control lever may thus elevate the leg 17 out of engagement with the ground and hold said leg in an elevated position, or may permit the spring pressed plunger 39 to engage said leg with the ground.

The opposite leg 17 is operated by means of a control lever 61, herein shown as being secured to the transverse shaft 55 on the outside of the control lever 54, for rocking said shaft. Said control lever 61 has a pin 62 slidably mounted therein for engagement with any one of a plurality of apertures formed in a sector 63, for locking said control lever in position. Said pin is urged into engagement with the desired aperture by means of a spring 64, engaging a hand grip 65, pivotally mounted on said control handle.

The end of the shaft 55 opposite from the control lever 61 extends beyond the right-hand side wall 51 of the frame 15 and has a lever arm 66 secured thereto and rocked thereby. Said lever arm has a flexible cable 67 secured thereto, which is trained therefrom in a forward direction past a horizontal sheave 69, and forwardly therefrom to and around a vertical sheave 70 and downwardly therefrom to the right-hand leg 17, to which said cable is attached (see Figure 1).

The legs 17, 17 are yieldably held inwardly towards the extensible trough 11 and frame 15, and are returned from the outwardly extended portion shown by broken lines in Figure 1, at the ends of the forward strokes of the conveyer, to an initial starting position alongside of said extensible trough, as shown by solid lines in Figure 1, by means of a tension spring 71, connected at its opposite ends to ears 73, 73 extending inwardly from the swinging frames 26, 26.

Figure 6:
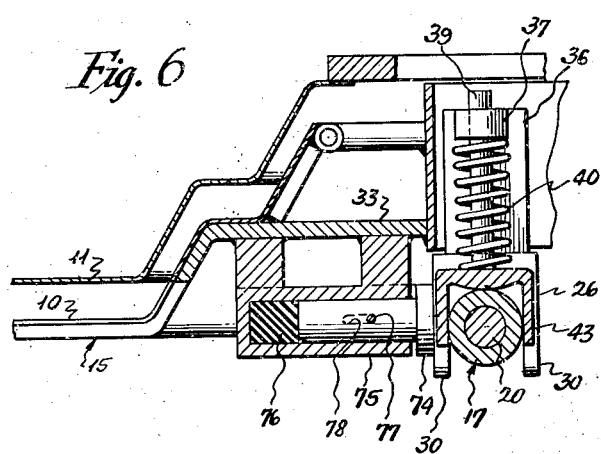
Figure 6 is a fragmentary transverse sectional view taken substantially along line 6—6 of Figure 1.

Stops are provided to limit inward movement of the legs 17, 17 towards the extensible trough 11 and to properly position said legs to swing said trough during the forward strokes of the conveyor. Said stops, as herein shown, each comprise a plunger 74 slidably mounted in a guide member 75 secured to and depending from the horizontal plate 33 of the frame 15. The inner end of said plunger is abutted by a yieldable member 76 mounted in said guide members, and herein shown as being a rubber bumper. Movement of said stop with respect to said guide member is limited by means of a cotter key 77 mounted in said plunger and engaging slots 78, 78 formed in opposite side walls of the guide member 75 (see Figures 1 and 6).

When it is desired to move the shovel 12 to the right, the left-hand leg 17 may be lowered by release of the pin 56 from its respective aperture in the sector 57, and permitting the spring pressed plunger 39 to engage the claw 19 with the ground. When the claw 19 is engaged with the ground during the forward strokes of the conveyer, the leg 17 will tend to pivot outwardly away from the side of the trough 10 against the spring 71, but at the same time will exert a force to tend to lift and move said trough and the extensible trough 11 to the right. During the return strokes of the conveyer the claw 19 will be dragged rearwardly along the ground in a position similar to that shown in Figure 4, the plunger 39 holding said claw in position to obtain a firm grip on the ground when the conveyer starts on its forward stroke. The hand may usually be removed from the control lever 54, permitting the claw 19 to engage the ground until the shovel 12 has been moved to the desired position, at which time said claw and leg may be raised out of engagement with the ground by operation of the control lever 54, and may be held in a disengaged position by the locking pin 56, in the hereinbefore described manner.

When it is desired to move the shovel 12 in a direction toward the left, the pin 62 on the control handle 61 may be released to permit the spring pressed plunger 39 engaging the right-hand leg 17, to yieldably engage the claw 19 on the forward end of said leg, with the ground. Otherwise the operation of moving said shovel to the left is the same as has been described in the foregoing with regard to moving said shovel to the right.

While I have herein shown and described one form in which my invention may be embodied, it will be understood that the construction thereof and the arrangement of the various parts may be altered without departing from the spirit and scope thereof. Furthermore, I do not wish to be

I claim as my invention:

1. In a device for laterally swinging the pick-up end of a shaker conveyer, a frame pivotally mounted on a trough of the conveyer for movement about an upright axis and extending generally longitudinally therealong, a leg mounted on said frame for movement about an axis extending transversely thereof into and out of engagement with the ground, spring means interposed between said frame and said leg for urging said leg into engagement with the ground, and means selectively operable to move said leg out of engagement with the ground.

2. In a device for laterally swinging the pick-up end of a shaker conveyer, a frame pivotally mounted on a trough of the conveyer for movement about an upright axis and extending generally longitudinally therealong, a leg mounted on said frame for movement about an axis extending transversely thereof into and out of engagement with the ground, spring means interposed between said frame and said leg for urging said leg into engagement with the ground, means connected with said leg for yieldably urging said leg to move in a direction towards the conveyer trough, and means selectively operable to positively move said leg out of engagement with the ground.

3. In a device for laterally swinging the pick-up end of a shaker conveyer, a frame pivotally mounted on a trough of the conveyer for movement about an upright axis and extending generally longitudinally therealong, a leg mounted on said frame for movement about an axis extending transversely thereof into and out of engagement with the ground, yieldable means for urging said leg into engagement with the ground, means selectively operable to positively move said leg out of engagement with the ground, other yieldable means connected with said frame for yieldably urging said leg and frame to move in a direction towards the conveyer trough, and abutment means mounted on a trough of the conveyer and adapted to be engaged by said frame, for limiting movement of said leg towards said conveyer trough.

4. In a device for laterally swinging the pick-up end of a shaker conveyer, a frame pivotally mounted on a trough of the conveyer for movement about an upright axis, a leg mounted on said frame for movement about an axis extending transversely thereof, a plunger interposed between said frame and leg for yieldably urging said leg into engagement with the ground, and means selectively operable to positively move said leg against said plunger out of engagement with the ground.

5. In a device for laterally swinging the pick-up end of a shaker conveyer, a frame pivotally mounted on a trough of the conveyer for movement about an upright axis, a leg mounted on said frame for movement about an axis extending transversely thereof, a spring pressed plunger interposed between said frame and leg for yieldably urging said leg into engagement with the ground, a spring connected with said frame for yieldably urging said leg and frame to move in a direction towards the conveyer trough, and means selectively operable to positively move said leg against said spring pressed plunger out of engagement with the ground.

6. In a device for laterally swinging the pick-up end of a shaker conveyer, a frame pivotally mounted on a trough of the conveyer for movement about an upright axis, a leg mounted on said frame for movement about an axis extending transversely thereof, a spring pressed plunger interposed between said frame and leg for yieldably urging said leg into engagement with the ground, means selectively operable to positively move said leg against said plunger out of engagement with the ground, a spring connected with said frame for yieldably urging said leg and frame to move in a direction towards the conveyer trough, and means for limiting movement of said leg towards said conveyer trough.

7. In a device for laterally swinging the pick-up end of a shaker conveyer, a frame pivotally mounted on each side of a trough of the conveyer for movement about an upright axis, a leg mounted on each of said frames for movement about an axis extending transversely thereof into and out of engagement with the ground, means for yieldably urging said legs into engagement with the ground, and means selectively operable to positively move either or both of said legs out of engagement with ground.

8. In a device for laterally swinging the pick-up end of a shaker conveyer, a frame pivotally mounted on each side of a trough of the conveyer for movement about an upright axis, a leg mounted on each of said frames for movement about an axis extending transversely thereof into and out of engagement with the ground, yieldable means connected between said frames for urging said frames to move in directions towards the conveyer trough, means for yieldably urging said legs into engagement with the ground, and means selectively operable to move either or both of said legs out of engagement with the ground.

9. In a device for laterally swinging the pick-up end of a shaker conveyer, a frame pivotally mounted on each side of a trough of the conveyer for movement about an upright axis, a leg mounted on each of said frames for movement about an axis extending transversely thereof into and out of engagement with the ground, a spring connecting said frames together, for urging said frames to move in a direction towards the conveyer trough, stops for limiting movement of said legs towards the conveyer trough, spring means for yieldably urging said legs into engagement with the ground, and control means selectively operable from one side of the conveyer, to move either or both of said legs out of engagement with the ground.

ERNST R. BERGMANN.

REFERENCES CITED

The following references are of record in the file of this patent:

UNITED STATES PATENTS

| Number | Name | Date |
| --- | --- | --- |
| 2,276,238 | MacPherson | Mar. 10, 1942 |